United States Patent
Liu et al.

(10) Patent No.: US 12,554,713 B1
(45) Date of Patent: Feb. 17, 2026

(54) OPTIMIZING QUERY EXECUTION IN A DATA VIRTUALIZATION SYSTEM

(71) Applicant: International Business Machines Corporation, Armonk, NY (US)

(72) Inventors: Chang Sheng Liu, Beijing (CN); Yan Li Xu, Beijing (CN); Xue Huang, Beijing (CN); Lei Cui, Beijing (CN); Hai Jun Shen, Jin Nan (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/007,654

(22) Filed: Jan. 2, 2025

(51) Int. Cl.
*G06F 16/2453* (2019.01)

(52) U.S. Cl.
CPC .............. *G06F 16/24537* (2019.01)

(58) Field of Classification Search
CPC ................................. G06F 16/24537
USPC ........................................... 707/713
See application file for complete search history.

(56) References Cited

U.S. PATENT DOCUMENTS

| | | | | |
|---|---|---|---|---|
| 2011/0055239 | A1* | 3/2011 | Wolf | G06F 16/24568 707/759 |
| 2015/0379119 | A1* | 12/2015 | Chen | G06F 16/90344 707/713 |
| 2019/0065567 | A1* | 2/2019 | Griffith | G06F 16/2282 |
| 2023/0153302 | A1* | 5/2023 | Shen | G06F 16/256 707/716 |

FOREIGN PATENT DOCUMENTS

CN 116108025 A 5/2023

OTHER PUBLICATIONS

Authors et al., "A New Pushdown Checking Method Based on SQL Analysis in Data Virtualization", IP.com No. IPCOM000273486D, Dec. 12, 2023, 03 pages.
Improve performance for your data virtualization data sources with remote connectors, IBM Developer, Published Date: Sep. 2, 2021, 66 pages.
Levine Randy, "Push-Down SQL in Data Analytics: Performance, Scalability, and Cost-Effectiveness", Data Cloud | Pushdown SQL technology, Published Date: May 3, 2024, 11 pages.
Setting the query mode in Data Virtualization, IBM Documentation, Published Date: Jun. 27, 2024, 02 pages.

* cited by examiner

*Primary Examiner* — Baoquoc N To
(74) *Attorney, Agent, or Firm* — Yee & Associates, P.C.

(57) ABSTRACT

A computer-implemented method for optimizing query execution in a data virtualization system is provided. A processor set receives a query using the data virtualization system. The processor set determines capabilities for the data source to identify a portion of functions and a portion of query operations from the query to be delegated for remote execution on the data source. The processor set splits functions and query operations in the query for remote execution and local execution based on the portion of functions and the portion of query operations from the query. The processor set receives results from the data source from remote execution of the query using the data virtualization system. The processor set merges the results from the data source with second result from local execution of the query on the data virtualization system to generate a merged result. The processor set returns the merged result to the application.

20 Claims, 5 Drawing Sheets

OPTIMIZING QUERY EXECUTION IN A DATA VIRTUALIZATION SYSTEM

BACKGROUND

The disclosure relates generally to generating optimizing query execution and more specifically to optimizing query execution in a data virtualization system.

A data virtualization system refers to a software platform that allows users and applications to access, retrieve, and manipulate data without the need to know the physical location and format for the data. The data virtualization system provides a unified, abstract view of multiple data sources as if the data are in a single place even though the data may reside across various databases, file systems, or cloud services. In other words, the data virtualization system provides a virtual layer that integrates disparate data sources into a single abstracted view instead of copying data into a centralized warehouse.

In this case, the data virtualization system provides improved agility and flexibility in data management. Since data is not physically moved, users can query and access data in real-time, reducing the time it takes to extract insights. This feature is especially helpful for organizations with diverse and scattered data environments, such as multinational companies that need to work with data from various geographical locations or departments.

In addition, the data virtualization system enhances data governance and security by allowing central control over users who can access specific data without exposing the entire dataset. Organizations can apply governance polies, security measure, and compliance regulations more easily at the virtual layer provided by the data virtualization system, therefore ensuring that sensitive data remains protected while still being accessible for analysis and decision-making.

SUMMARY

According to one illustrative embodiment, a computer-implemented method for optimizing query execution in a data virtualization system is provided. A processor set receives a query using the data virtualization system. The query targets a data source from a plurality of data sources. The processor set determines capabilities for the data source to identify a portion of functions and a portion of query operations from the query to be delegated for remote execution on the data source. The processor set splits functions and query operations in the query for remote execution on the data source and local execution on the data virtualization system based on the portion of functions and the portion of query operations from the query. The processor set receives results from the data source from remote execution of the query on the data source using the data virtualization system. The processor set merges the results from the data source with second result from local execution of the query on the data virtualization system to generate a merged result. The processor set returns the merged result to the application. According to other illustrative embodiments, a computer system, and a computer program product for optimizing query execution are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 1:
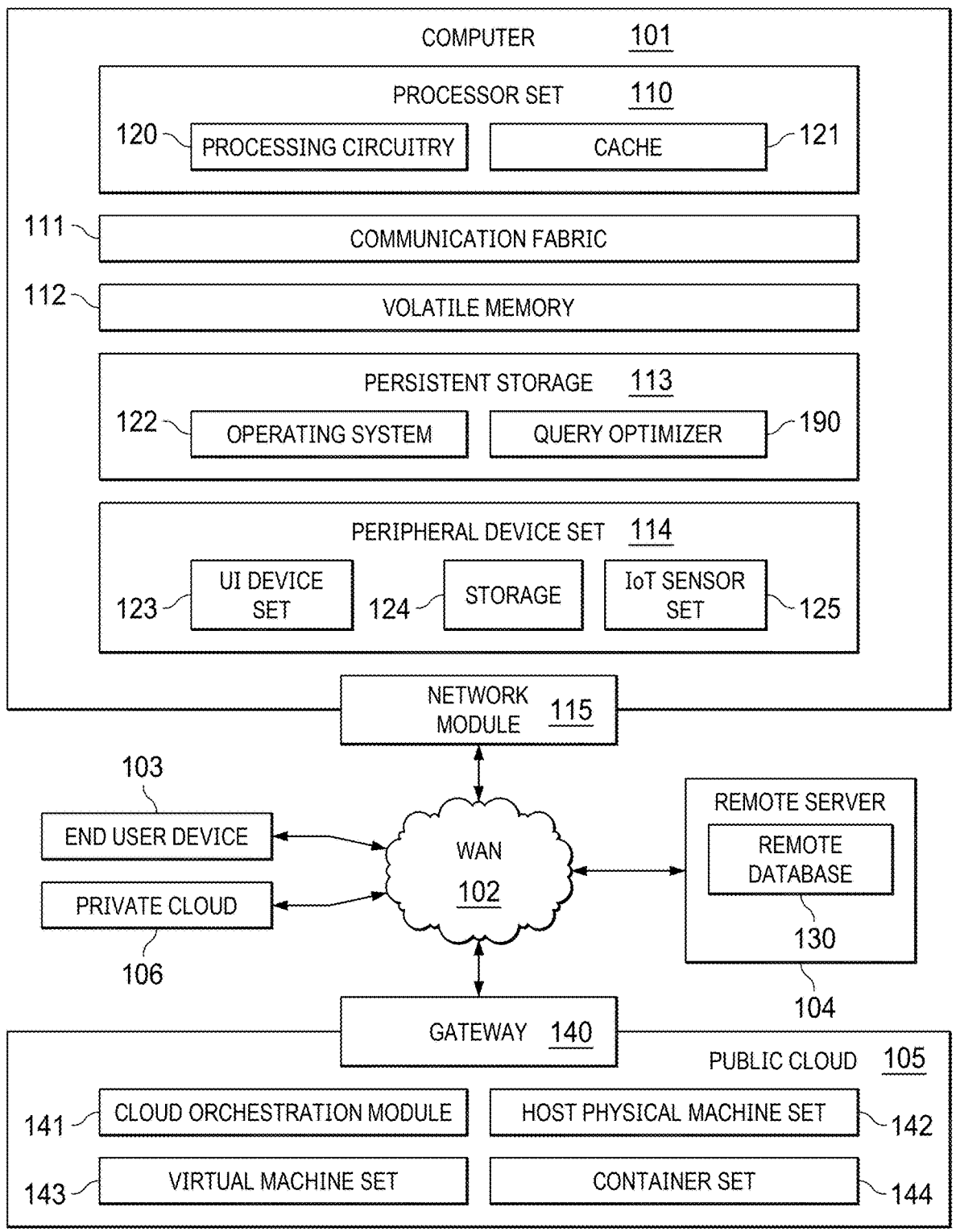
FIG. 1 is a pictorial representation of a computing environment in which illustrative embodiments may be implemented.

With reference now to the figures, and in particular with reference to FIG. 1, a block diagram of a computing environment is depicted in accordance with an illustrative embodiment. Computing environment 100 contains an example of an environment for the execution of at least some of the computer code involved in performing the inventive methods, such as query optimizer 190. In addition to query optimizer 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and query optimizer 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one or more computer processors of any type now known or to be developed in the future. Processing circuitry 120 may be distributed over multiple packages, for example, multiple coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions and associated data are accessed by processor set 110 to control and direct performance of the inventive methods. In computing environment 100, at least some of the instructions for performing the inventive methods may be stored in query optimizer 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, volatile memory 112 is located in a single package and is internal to computer 101, but, alternatively or additionally, volatile memory 112 may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in query optimizer 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as a thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data application portability between the multiple constituent clouds. In this embodiment, public cloud 105 and private cloud 106 are both part of a larger hybrid cloud.

CLOUD COMPUTING SERVICES AND/OR MICROSERVICES: Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account one or more different considerations as described herein. For example, the illustrative embodiments recognize and take into account that businesses increasingly rely on data virtualization systems to access and integrate data from various data resources. The illustrative embodiments recognize and take into account that network latency and the amount of data transferred between data virtualization system and data sources can often contribute to performance bottlenecks, leading to slow query response times.

The illustrative embodiments also recognize and take into account that different data sources have varying capabilities in terms of which query operations can be supported natively by the data sources. As a result, inefficient delegation decisions may occur, where operations that could have been handled remotely are instead executed locally, further degrading performance.

The illustrative embodiments also recognize and take into account that data sources often follow different semantics, such as case sensitivity or string formatting rules (e.g., handling trailing blanks). This inconsistency can lead to data mismatches and incorrect results when applications consume data from these data sources via data virtualization systems.

The illustrative embodiments also recognize and take into account that many data sources lack support for advanced query operations or functions that a data virtualization system can perform. In this case, the data virtualization system must compensate by processing these unsupported operations locally, creating an inefficient split in query execution. This fragmentation can lead to suboptimal performance and inconsistency in how query results are generated, requiring additional overhead in managing partial queries across different systems.

Thus, illustrative embodiments of the present invention provide a computer implemented method, computer system, and computer program product for optimizing query execution in a data virtualization system. In one illustrative example, a computer implemented method optimizes query execution in the data virtualization system. A processor set receives a query using the data virtualization system. The query targets a data source from a plurality of data sources. The processor set determines capabilities for the data source to identify a portion of functions and a portion of query operations from the query to be delegated for remote execution on the data source. The processor set splits functions and query operations in the query for remote execution on the data source and local execution on the data virtualization system based on the portion of functions and the portion of query operations from the query. The processor set receives results from the data source from remote execution of the query on the data source using the data virtualization system. The processor set merges the results from the data source with second result from local execution of the query on the data virtualization system to generate a merged result.

Figure 2:
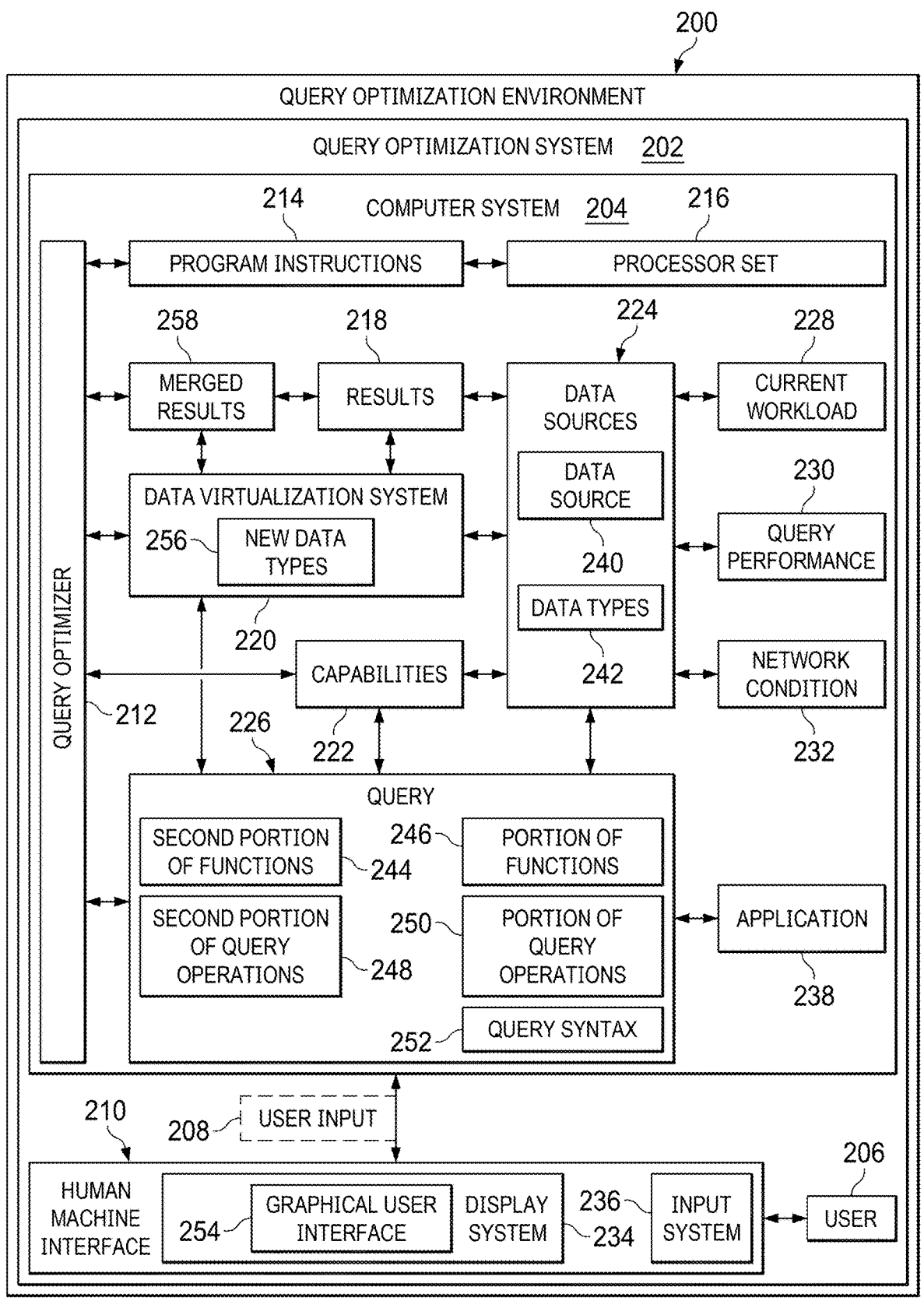
FIG. 2 is an illustration of a block diagram of a query optimization environment in accordance with an illustrative embodiment.

With reference now to FIG. 2, an illustration of a block diagram of a query optimization environment is depicted in accordance with an illustrative embodiment. In this illustrative example, query optimization environment 200 includes components that can be implemented in hardware such as the hardware shown in computing environment 100 in FIG. 1.

In this illustrative example, query optimization system 202 in query optimization environment 200 uses query optimizer 212 to optimize execution of query 226 received from application 238. In this illustrative example, query optimization system 202 includes computer system 204 which includes query optimizer 212. Query optimizer 212 is located in computer system 204. Query optimizer 212 may be implemented using query optimizer 190 in FIG. 1.

Query optimizer 212 can be implemented in software, hardware, firmware, or a combination thereof. When software is used, the operations performed by query optimizer 212 can be implemented in program instructions configured to run on hardware, such as a processor unit. When firmware is used, the operations performed by query optimizer 212 can be implemented in program instructions and data and stored in persistent memory to run on a processor unit. When hardware is employed, the hardware can include circuits that operate to perform the operations in query optimizer 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C," may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes processor set 216 that is capable of executing program instructions 214 implementing processes in the illustrative examples. In other words, program instructions 214 are computer-readable program instructions.

As used herein, a processor unit in processor set 216 is a hardware device and is comprised of hardware circuits such as those on an integrated circuit that respond to and process instructions and program code that operate a computer. A processor unit can be implemented using processor set 110 in FIG. 1. When processor set 216 executes program instructions 214 for a process, processor set 216 can be one or more processor units that are in the same computer or in different computers. In other words, the process can be distributed between processor set 216 on the same or different computers in computer system 204.

Further, processor set 216 can be of the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, computer system 204 includes data virtualization system 220 and query 226. In this illustrative example, data virtualization system 220 can delegate queries such as query 226 or portions of queries to data sources 224 for remote execution. In this illustrative example, data virtualization system 220 is a software platform that provides a unified, virtual view of data from data sources such as data sources 224. Data virtualization system 220 abstracts away the complexity and heterogeneity of the underlying data sources for allowing users and applications to access and manipulate data seamlessly, as if it were stored in a single, unified database.

As depicted, data virtualization system 220 does not physically store or replicate the data from the data sources but instead integrates and federates access to the data sources through a layer of abstraction. This layer of abstraction translates and optimizes queries such as query 226 and dynamically delegating parts of query execution to the most appropriate data source based on performance and capabilities.

In this illustrative example, data sources 224 are systems or repositories where data is stored and can be accessed or queried by the virtualization layer of data virtualization system 220. For example, data sources 224 can be an application, a file system, a streaming data source, a remote database or an external database such as relational database, NoSQL database, or any systems or repository that stores data. In this illustrative example, queries such as query 226 can target specific data source in data sources 224 for remote execution. For example, query 226 received from application 238 can target data source 240 for remote execution.

In this illustrative example, query optimizer 212 can determine capabilities 222 for data source 240 after query 226 is received from application 238 in real-time. Capabilities 222 refers to what data source 240 can handle or support during execution of query 226. In other words, capabilities 222 defines how data source 240 can be queried and query operations and functions that can be supported by data source 240.

In this illustrative example, query optimizer 212 can determine capabilities 222 in a number of ways. For example, query optimizer 212 can model data source 240 by mapping data types such as data types 242 for data sources 224. In this illustrative example, data types 242 for data sources 224 can include non-standard data types such as Impala string, which may not be supported by data virtualization system 220. In this illustrative example, query optimizer 212 can convert data types 242 into new data types 256 supported by data virtualization system 220. Alternatively, query optimizer 212 can convert data with data types 242 into new data with new data types 256, which is supported by data virtualization system 220.

In this illustrative example, query optimizer 212 can map non-standard data types from data source 240 to standard types supported by the data virtualization system 220. For example, string types from the data source 240 can be mapped based on the maximum stored length, allowing for optimized data transfer and processing.

In addition, query optimizer 212 can also determine if data source 240 supports all functions specified in query 226. In this illustrative example, functions in query 226 that are not supported by data source 240 can be flagged for local execution on data virtualization system 220.

Further, query optimizer 212 can also determine other attributes for data source 240. For example, query optimizer 212 can determine which query operations from query 226 can be executed on data source 240. In a similar fashion, query operations in query 226 that are not supported by data source 240 can be flagged for local execution on data virtualization system 220. In another example, query optimizer 212 can also adjust query syntax 252 for query 226 to match dialect of data source 240 for remote query execution. In this illustrative example, dialect of data source 240 refers to features of specific version of query language supported by data source 240. For example, dialect of data source 240 can include specific functions, syntax, and data types.

In this illustrative example, query optimizer 212 performs analysis based on capabilities 222 such that query execution for query 226 can be split into local execution, which is performed by data virtualization system 220 and remote execution, which is performed by data source 240.

In this illustrative example, query optimizer 212 identifies portion of functions 246 and portion of query operations 250 in query 226. Portion of functions 246 and portion of query operations 250 are functions and query operations supported by data source 240. In other words, portion of functions 246 and portion of query operations 250 are parts in query 226 that can be delegated to data source 240 for remote execution.

On the other hand, query optimizer 212 identifies second portion of functions 244 and second portion of query operations 248 in query 226. In this illustrative example, second portion of functions 244 and second portion of query operations 248 are functions and query operations not supported by data source 240. In other words, second portion of functions 244 and portion of query operations 248 are parts in query 226 that are executed locally on data virtualization system 220. In this illustrative example, query optimizer 212 ensures that delegation of portions for query 226 includes as many query operations and functions as possible for remote execution to minimize data transfer over network.

In this illustrative example, query optimizer 212 defines clear boundaries between which query operations can be executed remotely on data sources 224 and which must be handled locally on data virtualization system 220. This allows dynamic optimization of the query execution plan for query delegation between data sources 224 and data virtualization system 220, based on the specific capabilities of each data source from data sources 224.

In this illustrative example, data source 240 transfers results 218 to data virtualization system 220 for further processing. Results 218 is generated by data source 240 from remote execution of portion of functions 246 and portion of query operations 250 on data source 240. In this illustrative example, results 218 can be normalized in data virtualization system 220 to revolve semantic inconsistencies for results 218.

The normalization of results 218 can be performed in a number of ways. For example, the trailing spaces in results 218 can be trimmed if data source 240 ignores trailing spaces. In another example, if the data source 240 is case-insensitive but application 238 or data virtualization system 220 is case-sensitive, data in results 218 can be adjusted to align with the case requirements of application 238 or data virtualization system 220. In addition, normalization of results 218 can include any suitable techniques or transformation such that format for results 218 is consistent with format for result generated by data virtualization system 220 from local execution of query 226.

In this illustrative example, instead of applying normalization functions during query execution at data source 240, the normalization of results 218 happens without modifying query 226 or adding extra processing load on data source 240, thereby preserving the integrity of indexes and maintaining high performance.

In this illustrative example, results generated by data virtualization system 220 from local execution of query 226 are merged with results 218 to generate merged results 258. As a result, query optimizer 212 can return merged results 258 to application 238.

Query optimizer 212 can further monitor capabilities 222 and query executions for data sources 224 to evaluate query performance 230 in real-time, current workload 228, and network condition 232 for data sources 224. In this illustrative example, query performance 230 for data encompasses a wide range of considerations that contribute to the overall efficiency and responsiveness of data sources 224.

For example, the query performance 230 can include execution time, resource utilization, throughput, latency, and scalability. In this example, execution time is the time taken to complete a query, which start from initiation to result retrieval. Resource utilization is the extent to which the system's hardware resources (e.g., CPU, memory, disk I/O, etc.) are utilized during query execution. Throughput is the number of queries that can be processed by data sources 224 within a given time frame. In this illustrative example, high throughput indicates that the system can handle a large volume of queries efficiently. Scalability is the ability of data sources 224 to handle an increasing workload without significantly degrading performance.

In this illustrative example, network condition 232 refers to various factors that describe the quality, performance, and reliability of a network connection between data virtualization system 220 and data sources 224. For example, network condition 233 can include latency, bandwidth, packet loss, network congestion, or connection stability for the network connection between data virtualization system 220 and data sources 224.

In this illustrative example, query optimizer 212 can also determine network transfer times to determine network condition 232 by simulating transfer of data between data virtualization system 220 and data sources 224. In this illustrative example, data that is being transferred between data virtualization system 220 and data sources 224 can include data with different sizes and data types. In other words, network transfer times includes data transfer times between data virtualization system 220 and data sources 224 for data of various types and sizes.

In addition, current workload 228 indicates amount of queries that are being processed by data sources 224. In this illustrative example, network condition 232, current workload 228, and query performance 230 are periodically reevaluated to reflect the most up to date condition and performance for data sources 224.

In this illustrative example, query optimizer 212 can dynamically adjust delegation of queries between data virtualization system 220 and data source 240 based on query performance 230, current workload 228, and network condition 232. For example, more queries or more portions of queries can be delegated to data sources 224 for remote execution when query performance 230, current workload 228, and network condition 232 indicate that efficiency for executing queries exceeds a threshold. On the other hand, less queries can be delegated to data sources 224 for remote execution when query performance 230, current workload 228, and network condition 232 indicate that efficiency for executing queries does not meet the threshold.

In this illustrative example, the threshold can be a user-defined threshold, or automatically determined by query optimizer 212 based on evaluation generated upon monitoring capabilities 222 and query executions for data sources 224.

In this illustrative example, query optimizer 212 can also track which query operations are most frequently delegated to data sources 224 or processed locally on data virtualization system 220. Subsequently, query optimizer 212 can adapt delegations for future queries to optimize performance. This involves maintaining a knowledge base of capabilities and behavior for data sources 224, which can dynamically influence the delegation between data sources 224 and data virtualization system 220. In addition, query optimizer 212 can also cache commonly used queries, delegation patterns, and normalization rules to further reduce execution times and improve efficiency for repeated queries.

In this illustrative example, user 206 can interact with computer system 204 through user inputs to computer system 204. In this illustrative example, user input 208 can be generated by user 206 using human machine interface (HMI) 210. As depicted, human machine interface 210 includes display system 234 and input system 236. Display system 234 is a physical hardware system and includes one or more display devices on which graphical user interface 254 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

In this example, user 206 is a person that can interact with graphical user interface 254 through user input 208 generated by input system 236. Input system 236 is a physical hardware system and can be selected from at least one of a mouse, a keyboard, a touch pad, a trackball, a touchscreen, a stylus, a motion sensing input device, a gesture detection device, a data glove, a cyber glove, a haptic feedback device, or some other suitable type of input device. In this illustrative example, user 206 can utilize graphical user interface 254 to view visualization of query performance 230 and network condition 232 for data sources 224, or results 218 and merged results 258. In addition, user 206 can utilize human machine interface 210 to view and determine accuracies for portion functions 246, portion of query operations 250, second portion of functions 244, and second portion of query operations 248.

In one illustrative example, one or more solutions are present that overcome a problem with optimizing query executions. As a result, one or more technical solutions may provide an ability to increase the efficiency for query executions in computer system 204.

In the illustrative example, computer system 204 can be configured to perform at least one of the steps, operations, or actions described in the different illustrative examples using software, hardware, firmware, or a combination thereof. As a result, computer system 204 operates as a special purpose computer system in which query optimizer 212 in computer system 204 enables efficient execution of queries such as query 226 by optimizing query executions and dynamically adjusting delegations between data virtualization system 220 and data sources 224. In particular, query optimizer 212 transforms computer system 204 into a special purpose computer system as compared to currently available general computer systems that do not have a query optimizer 212.

In the illustrative example, the use of query optimizer 212 in computer system 204 integrates processes into a practical application for optimizing query execution. In other words, query optimizer 212 in computer system 204 is directed to a practical application of processes integrated into query optimizer 212 in computer system 204 that optimizes query execution. In this illustrative example, query optimizer 212 can efficiently help computer system 204 to increase computer performance and resources allocation by optimizing query execution and dynamically adjusting query delegations.

In this illustrative example, query optimizer 212 can maximize executions of query operations on remote data sources by analyzing which query operations can be supported remotely. In other words, query optimizer 212 minimizes network data transfer and ensures that only unsupported query operations are processed locally by data virtualization system 220. This leads to significant performance improvements in query execution.

The illustration of query optimization environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, multiple queries can be processed simultaneously by query optimizer 212 in computer system 204.

Figure 3:
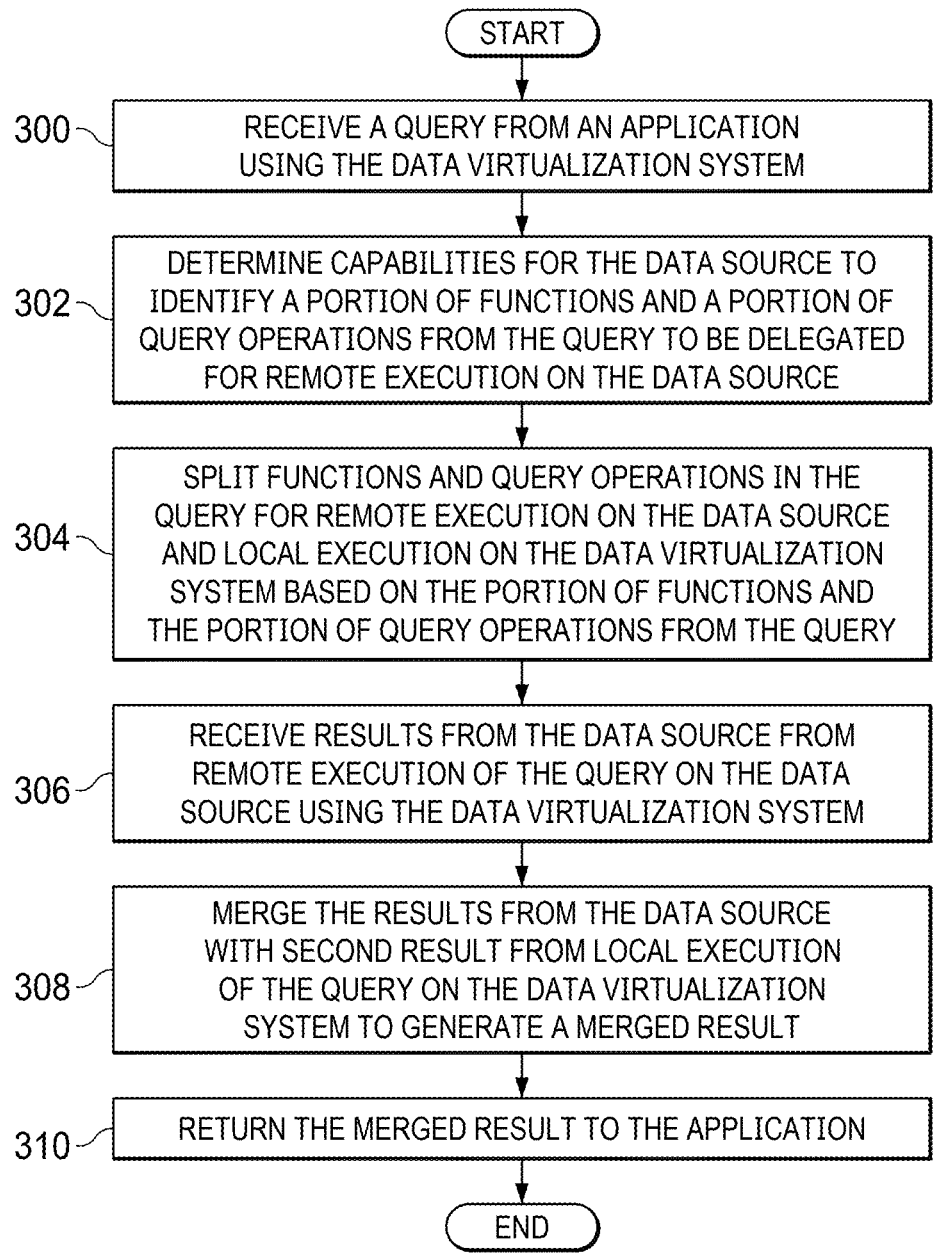
FIG. 3 is a flowchart of a process for optimizing query execution in accordance with an illustrative embodiment.

With reference now to FIG. 3, a flowchart illustrating a process for optimizing query execution is shown in accordance with an illustrative embodiment. The process in FIG. 3 can be implemented in hardware, software, or both. When implemented in software, the process can take the form of program instructions that are run by one of more processor units located in one or more hardware devices in one or more computer systems. For example, the process can be implemented in query optimizer 212 in computer system 204 in FIG. 2.

The process begins by receiving a query from an application using the data virtualization system (step 300). The process determines capabilities for the data source to identify a portion of functions and a portion of query operations from the query to be delegated for remote execution on the data source (step 302). The process splits functions and query operations in the query for remote execution on the data source and local execution on the data virtualization system based on the portion of functions and the portion of query operations from the query (step 304). The process receives results from the data source from remote execution of the query on the data source using the data virtualization system (step 306). The process merges the results from the data source with second result from local execution of the query on the data virtualization system to generate a merged result (step 308). The process returns the merged result to the application (step 310). The process terminates thereafter.

Figure 4:
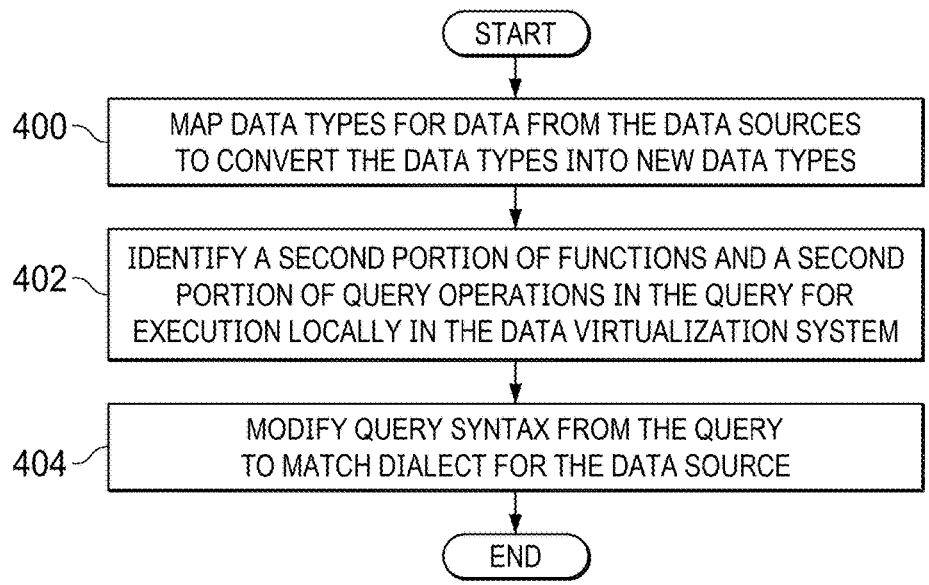
FIG. 4 is a flowchart of a process for determining capabilities for the data source to identify functions and query operations from the query to be delegated for remote execution in accordance with an illustrative embodiment.

Turning next to FIG. 4, a flowchart of a process for determining capabilities for the data source to identify functions and query operations from the query to be delegated for remote execution is depicted in accordance with an illustrative embodiment. The process in this flowchart is an example of an implementation for step 302 in FIG. 3.

The process begins by mapping data types for data from the data sources to convert the data types into new data types (step 400). In step 400, the new data types are supported by the data virtualization system. The process identifies a second portion of functions and a second portion of query operations in the query for execution locally in the data virtualization system (step 402). In this step, the portion of functions and the second portion of query operations are not supported by the data source. The process modifies query syntax from the query to match dialect for the data source (step 404). The process terminates thereafter.

Figure 5:
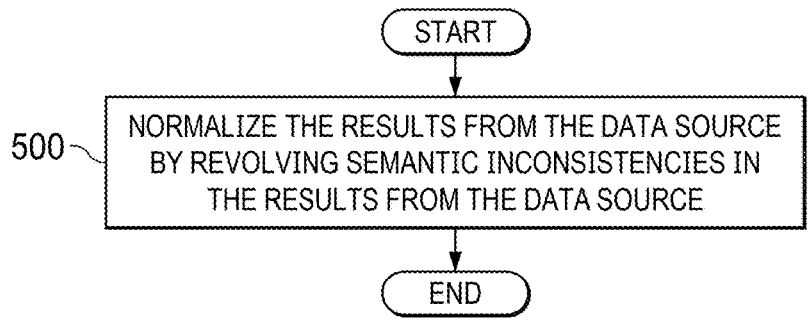
FIG. 5 is a flowchart of a process for normalizing results in accordance with an illustrative embodiment.

Turning next to FIG. 5, a flowchart of a process for normalizing results is depicted in accordance with an illustrative embodiment. The process in this figure is an example of an additional step that can be performed with the steps in FIG. 3.

The process begins by normalizing the results from the data source by revolving semantic inconsistencies in the results from the data source (step 500). In this step, the semantic inconsistencies comprise issues associated with trailing blanks and case sensitivity. The process terminates thereafter.

Figure 6:
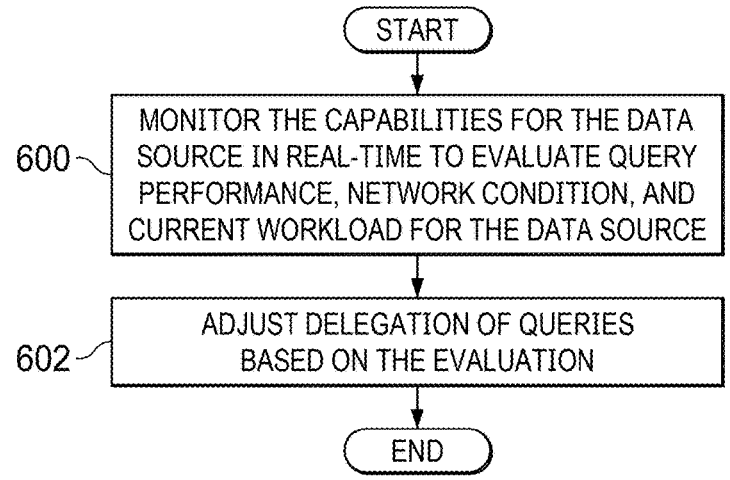
FIG. 6 is a flowchart of a process for adjusting delegation of queries in accordance with an illustrative embodiment.

Turning next to FIG. 6, a flowchart of a process for adjusting delegation of queries is depicted in accordance with an illustrative embodiment. The process in this figure is an example of an additional step that can be performed with the steps in FIG. 3.

The process begins by monitoring the capabilities for the data source in real-time to evaluate query performance, network condition, and current workload for the data source (step 600). The process adjusts delegation of queries based on the evaluation (step 602). The process terminates thereafter.

Figure 7:
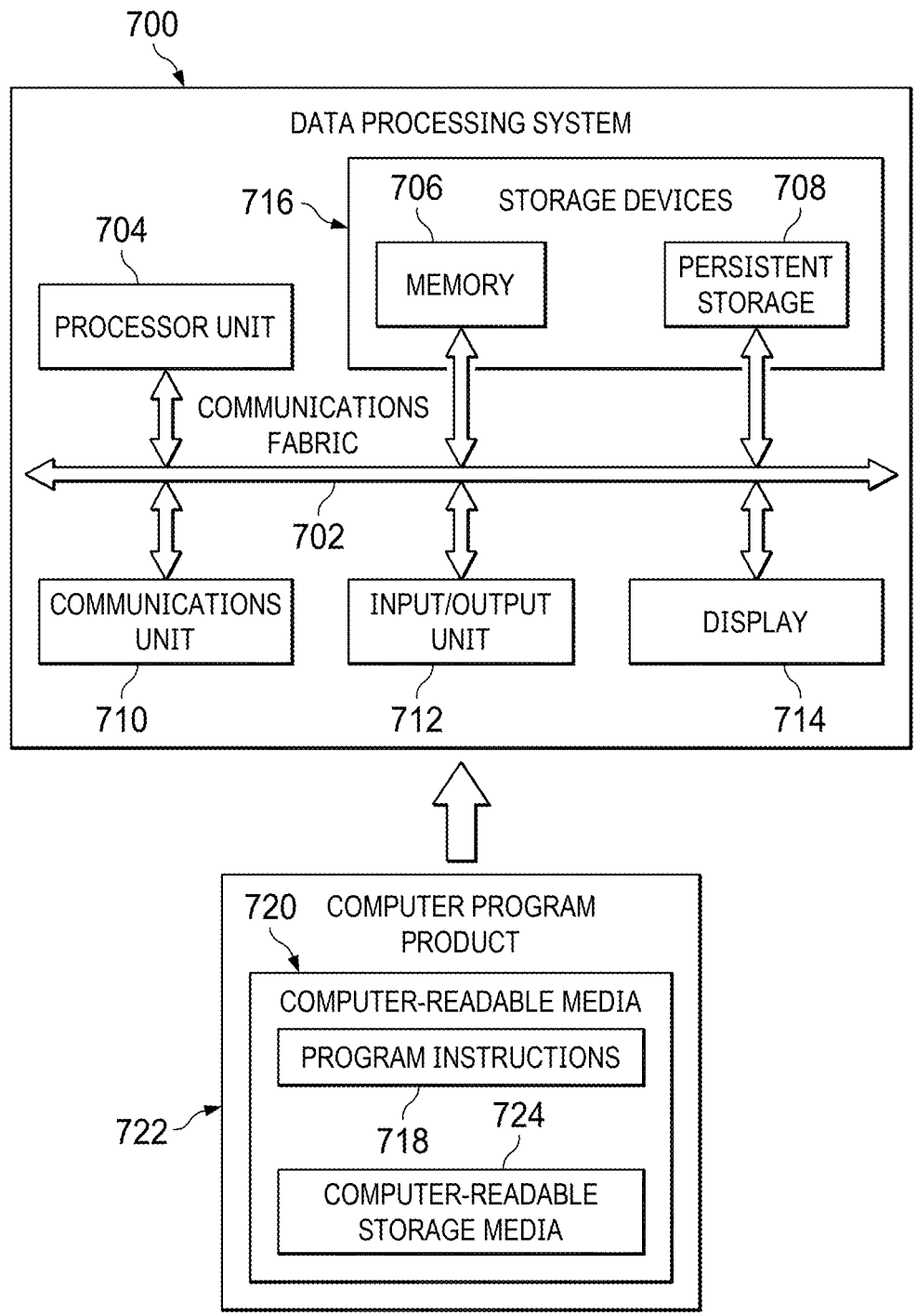
FIG. 7 is a block diagram of a data processing system in accordance with an illustrative embodiment.

Turning now to FIG. 7, a block diagram of a data processing system is depicted in accordance with an illustrative embodiment. Data processing system 700 can be used to implement computers and computing devices in computing environment 100 in FIG. 1. Data processing system 700 can also be used to implement computer system 204 in FIG. 2. In this illustrative example, data processing system 700 includes communications framework 702, which provides communications between processor unit 704, memory 706, persistent storage 708, communications unit 710, input/output (I/O) unit 712, and display 714. In this example, communications framework 702 takes the form of a bus system.

Processor unit 704 serves to execute instructions for software that can be loaded into memory 706. Processor unit 704 includes one or more processors. For example, processor unit 704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 704 can be implemented using one or more heterogeneous processor systems in which a main processor is present with secondary processors on a single chip. As another illustrative example, processor unit 704 can be a symmetric multiprocessor system containing multiple processors of the same type on a single chip.

Memory 706 and persistent storage 708 are examples of storage devices 716. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 716 may also be referred to as computer-readable storage devices in these illustrative examples. Memory 706, in these examples, can be, for example, a random-access memory or any other suitable volatile or non-volatile storage device. Persistent storage 708 may take various forms, depending on the particular implementation.

For example, persistent storage 708 may contain one or more components or devices. For example, persistent storage 708 can be a hard drive, a solid-state drive (SSD), a flash memory, a rewritable optical disk, a rewritable magnetic tape, or some combination of the above. The media used by persistent storage 708 also can be removable. For example, a removable hard drive can be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that can be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs can be located in storage devices 716, which are in communication with processor unit 704 through communications framework 702. The processes of the different embodiments can be performed by processor unit 704 using computer-implemented instructions, which may be located in a memory, such as memory 706.

These instructions are referred to as program instructions, computer usable program instructions, or computer-readable program instructions that can be read and executed by a processor in processor unit 704. The program instructions in the different embodiments can be embodied on different physical or computer-readable storage media, such as memory 706 or persistent storage 708.

Program instructions 718 are located in a functional form on computer-readable media 720 that is selectively removable and can be loaded onto or transferred to data processing system 700 for execution by processor unit 704. Program instructions 718 and computer-readable media 720 form computer program product 722 in these illustrative examples. In the illustrative example, computer-readable media 720 is computer-readable storage media 724.

Computer-readable storage media 724 is a physical or tangible storage device used to store program instructions 718 rather than a medium that propagates or transmits program instructions 718. Computer-readable storage media 724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 718 can be transferred to data processing system 700 using a computer-readable signal media. The computer-readable signal media are signals and can be, for example, a propagated data signal containing program instructions 718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 720" can be singular or plural. For example, program instructions 718 can be located in computer-readable media 720 in the form of a single storage device or system. In another example, program instructions 718 can be located in computer-readable media 720 that is distributed in multiple data processing systems. In other words, some instructions in program instructions 718 can be located in one data processing system while other instructions in program instructions 718 can be located in one data processing system. For example, a portion of program instructions 718 can be located in computer-readable media 720 in a server computer while another portion of program instructions 718 can be located in computer-readable media 720 located in a set of client computers.

The different components illustrated for data processing system 700 are not meant to provide architectural limitations to the manner in which different embodiments can be implemented. In some illustrative examples, one or more of the components may be incorporated in or otherwise form a portion of another component. For example, memory 706, or portions thereof, may be incorporated in processor unit 704 in some illustrative examples. The different illustrative embodiments can be implemented in a data processing system including components in addition to or in place of those illustrated for data processing system 700. Other components shown in FIG. 7 can be varied from the illustrative examples shown. The different embodiments can be implemented using any hardware device or system capable of running program instructions 718.

Thus, illustrative embodiments of the present disclosure provide a computer-implemented method, computer system, and computer program product for managing containers. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for optimizing query execution in a data virtualization system, the computer implemented method comprising:
   receiving, by a processor set using the data virtualization system, a query from an application, wherein the query targets a data source from a plurality of data sources for remote execution;
   splitting, by the processor set, functions and query operations in the query for remote execution on the data source and local execution on the data virtualization system based on a portion of functions and a portion of query operations identified from the query based on capabilities for the data source, wherein the portion of functions and the portion of query operations are functions and operations to be delegated for remote execution on the data source, and wherein the capabilities for the data source define query operations and functions that are supported by the data source such that functions and query operations in the query that are unsupported by the data source are executed locally on the data virtualization system;
   receiving, by the processor set using the data virtualization system, results from the data source from remote execution of the query on the data source;
   merging, by the processor set, the results from the data source with second result from local execution of the query on the data virtualization system to generate a merged result; and
   returning, by the processor set, the merged result to the application.

2. The computer implemented method of claim 1, wherein splitting, by the processor set, functions and query operations in the query for remote execution on the data source and local execution on the data virtualization system based on the portion of functions and the portion of query operations identified from the query comprises:
   mapping, by the processor set, data types for data from the data sources to convert the data types into new data types, wherein the new data types are supported by the data virtualization system;
   identifying, by the processor set, a second portion of functions and a second portion of query operations in the query for execution locally in the data virtualization system, wherein the portion of functions and the second portion of query operations are not supported by the data source; and
   modifying, by the processor set, query syntax from the query to match dialect for the data source.

3. The computer implemented method of claim 2, wherein the data types comprise a non-standard data type.

4. The computer implemented method of claim 1, further comprising:
   normalizing, by the processor set, the results from the data source by revolving semantic inconsistencies in the results from the data source, wherein the semantic inconsistencies comprise issues associated with trailing blanks and case sensitivity.

5. The computer implemented method of claim 1, wherein all functions and query operations in the portion of functions and the portion of query operations are supported by the data source.

6. The computer implemented method of claim 1, further comprising:
   monitoring, by the processor set, the capabilities for the data source in real-time to evaluate query performance, network condition, and current workload for the data source; and
   adjusting, by the processor set, delegation of queries based on the evaluation.

7. The computer implemented method of claim 1, wherein the portion of functions and the portion of query operations from the query are selected based on a business requirement specified by a user.

8. A computer system for optimizing query execution in a data virtualization system, comprising:
   a processor set;
   a set of one or more computer-readable storage media; and
   program instructions stored on the set of one or more storage media to cause the processor set to perform operations comprising:
      receiving a query from an application using the data virtualization system, wherein the query targets a data source from a plurality of data for remote execution;
      splitting functions and query operations in the query for remote execution on the data source and local execution on the data virtualization system based on a portion of functions and a portion of query operations identified from the query based on capabilities for the data source, wherein the portion of functions and the portion of query operations are functions and operations to be delegated for remote execution on the data source, and wherein the capabilities for the data source define query operations and functions that are supported by the data source such that functions and query operations in the query that are unsupported by the data source are executed locally on the data virtualization system;

receiving results from the data source from remote execution of the query on the data source using the data virtualization system;

merging the results from the data source with second result from local execution of the query on the data virtualization system to generate a merged result; and returning the merged result to the application.

9. The computer system of claim 8, wherein the splitting functions and query operations in the query for remote execution on the data source and local execution on the data virtualization system based on the portion of functions and the portion of query operations identified from the query comprises:

mapping data types for data from the data sources to convert the data types into new data types, wherein the new data types are supported by the data virtualization system;

identifying a second portion of functions and a second portion of query operations in the query for execution locally in the data virtualization system, wherein the portion of functions and the second portion of query operations are not supported by the data source; and modifying query syntax from the query to match dialect for the data source.

10. The computer system of claim 9, wherein the data types comprise a non-standard data type.

11. The computer system of claim 8, wherein the operations further comprise:

normalizing the results from the data source by revolving semantic inconsistencies in the results from the data source, wherein the semantic inconsistencies comprise issues associated with trailing blanks and case sensitivity.

12. The computer system of claim 8, wherein all functions and query operations in the portion of functions and the portion of query operations are supported by the data source.

13. The computer system of claim 8, wherein the operations further comprise:

monitoring the capabilities for the data source in real-time to evaluate query performance, network condition, and current workload for the data source; and adjusting delegation of queries based on the evaluation.

14. The computer system of claim 8, wherein the portion of functions and the portion of query operations from the query are selected based on a business requirement specified by a user.

15. A computer program product for optimizing query execution in a data virtualization system, comprising:

a set of one or more computer-readable storage media;

program instructions stored in the set of one or more storage media to perform operations comprising:

receiving, by a processor set using the data virtualization system, a query from an application, wherein the query targets a data source from a plurality of data sources for remote execution;

splitting, by the processor set, functions and query operations in the query for remote execution on the data source and local execution on the data virtualization system based on a portion of functions and a portion of query operations identified from the query based on capabilities for the data source, wherein the portion of functions and the portion of query operations are functions and operations to be delegated for remote execution on the data source, and wherein the capabilities for the data source define query operations and functions that are supported by the data source such that functions and query operations in the query that are unsupported by the data source are executed locally on the data virtualization system;

receiving, by the processor set using the data virtualization system, results from the data source from remote execution of the query on the data source;

merging, by the processor set, the results from the data source with second result from local execution of the query on the data virtualization system to generate a merged result; and returning, by the processor set, the merged result to the application.

16. The computer program product of claim 15, wherein splitting, by the processor set, functions and query operations in the query for remote execution on the data source and local execution on the data virtualization system based on the portion of functions and the portion of query operations identified from the query comprises:

mapping, by the processor set, data types for data from the data sources to convert the data types into new data types, wherein the new data types are supported by the data virtualization system;

identifying, by the processor set, a second portion of functions and a second portion of query operations in the query for execution locally in the data virtualization system, wherein the portion of functions and the second portion of query operations are not supported by the data source; and modifying, by the processor set, query syntax from the query to match dialect for the data source.

17. The computer program product of claim 16, wherein the data types comprise a non-standard data type.

18. The computer program product of claim 15, wherein the operations further comprise:

normalizing, by the processor set, the results from the data source by revolving semantic inconsistencies in the results from the data source, wherein the semantic inconsistencies comprise issues associated with trailing blanks and case sensitivity.

19. The computer program product of claim 15, wherein all functions and query operations in the portion of functions and the portion of query operations are supported by the data source.

20. The computer program product of claim 15, wherein the operations further comprise:

monitoring, by the processor set, the capabilities for the data source in real-time to evaluate query performance, network condition, and current workload for the data source; and adjusting, by the processor set, delegation of queries based on the evaluation.

* * * * *